UNITED STATES PATENT OFFICE.

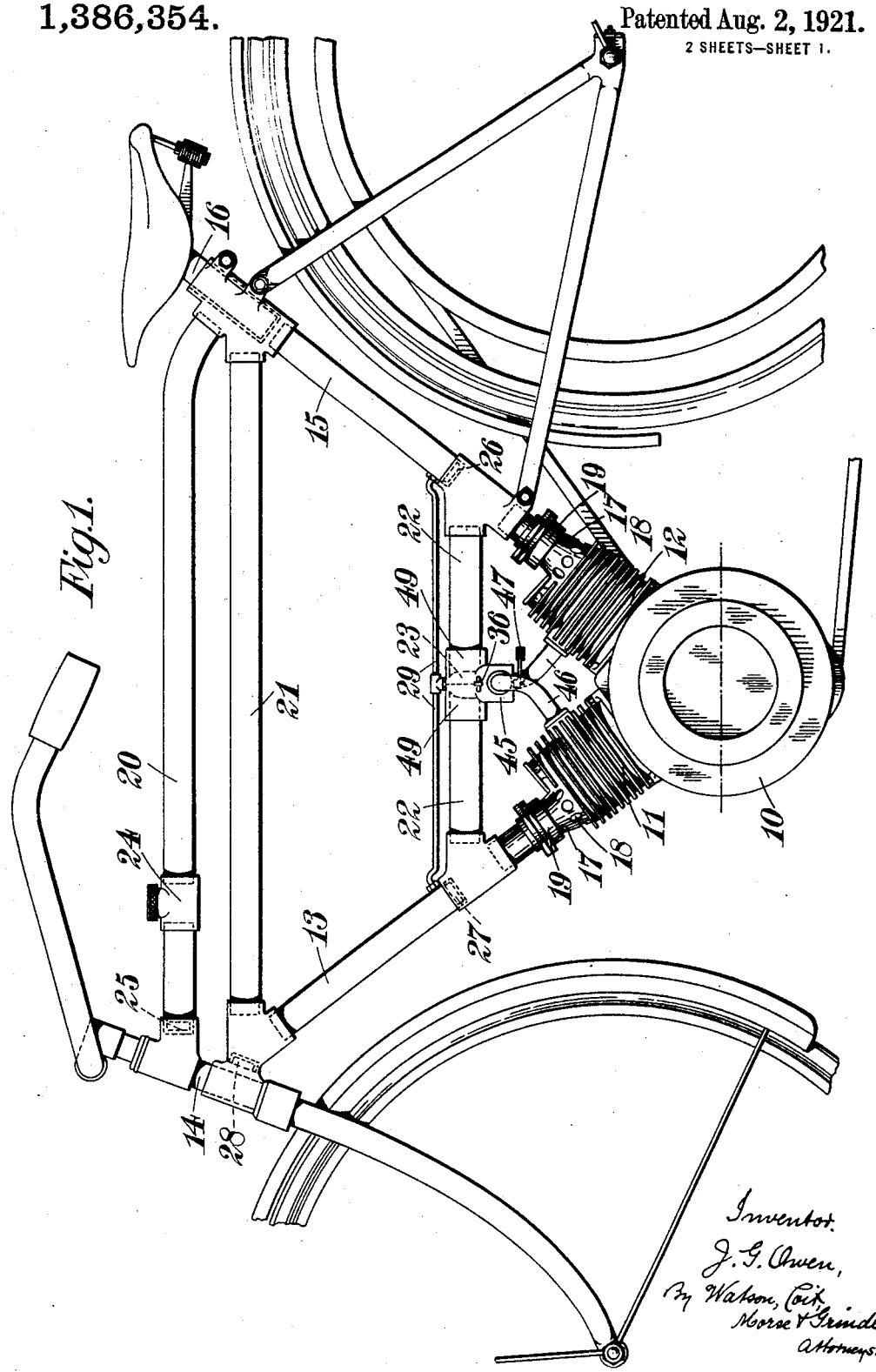

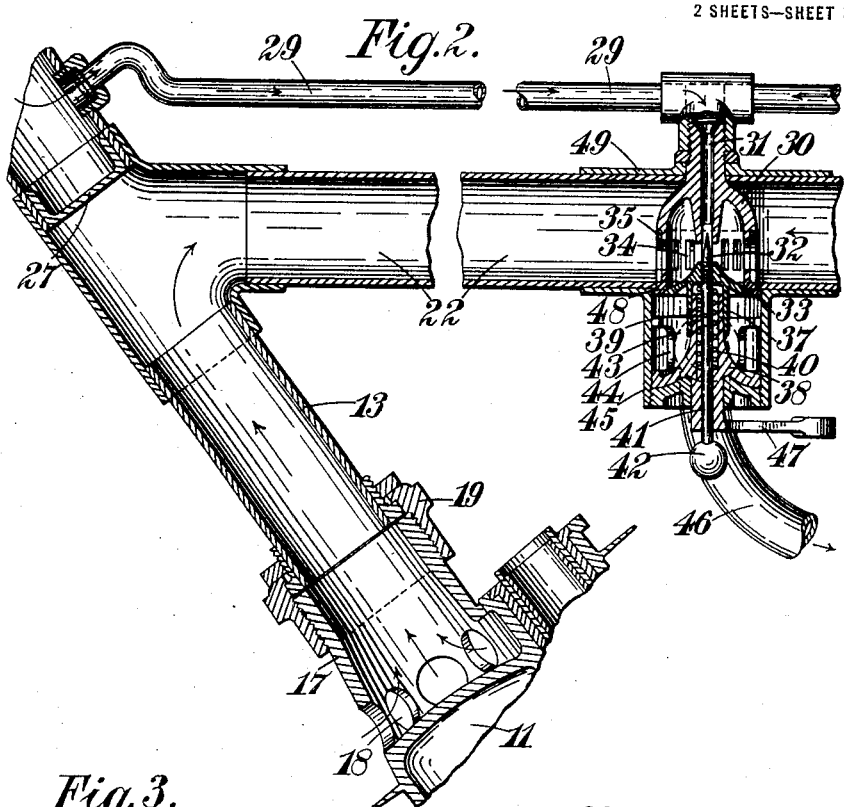
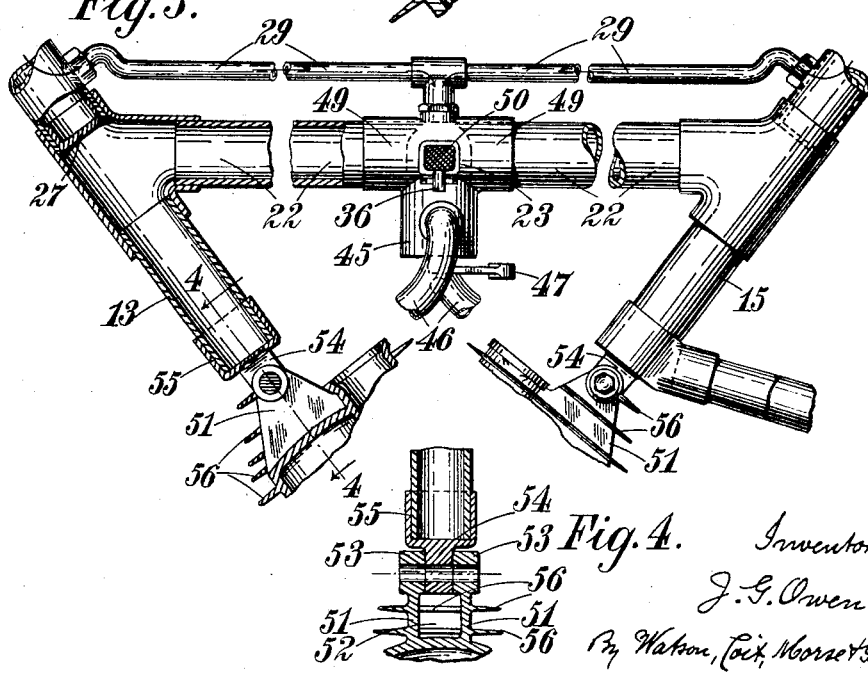

JOSEPH GLADSTONE OWEN, OF BRIGHTON, ENGLAND.

MOTOR-VEHICLE.

1,386,354.  Specification of Letters Patent.  Patented Aug. 2, 1921.

Application filed January 26, 1921. Serial No. 440,191.

*To all whom it may concern:*

Be it known that I, JOSEPH GLADSTONE OWEN, a subject of the King of England, residing at Brighton, in the county of Sussex, England, have invented certain new and useful Improvements in Motor-Vehicles (for which I have filed an application in Great Britain on December 4, 1919), of which the following is a specification.

This invention is for improvements in or relating to motor vehicles and has for one of its objects to provide for lightness and compactness of construction without sacrifice of strength. Another object of the invention is to improve the running efficiency, that is to say the mileage per gallon of motive fluid used. The invention is particularly applicable to motor bicycles but certain features of the invention are also applicable to other types of vehicles.

Many proposals have been made for decreasing the weight of and otherwise improving motor bicycles by special arrangement of the parts thereof; for example it has been proposed to employ a part of the tubular framework as a reservoir for the petrol or other motive fluid. It has also been proposed to arrange the engine cylinders in such a way as to constitute a part of the vehicle framework and to take up a portion of the stresses set up therein during travel, such cylinders being pivoted to the other parts of the vehicle framework. It has further been proposed in motor vehicles to feed the whole or a portion of the air to the carbureter through a conduit or conduits having heating means combined therewith. While these well-known features are embodied in the motor bicycle hereinafter described it will be clear from the following description that the disposition, arrangement and construction of the various parts include many important features of novelty whereby the efficiency, economy and reliability of the vehicle are enhanced.

According to one feature of the present invention a motor vehicle having one or more engine cylinders each secured to a member of the framework of the vehicle in such a manner as to form a continuation thereof, with the axis of the cylinder in alinement with the framework member, is characterized in that the connection between the cylinder and the framework member includes a hollow ported member open to air currents caused by travel of the vehicle. This ported arrangement may be used merely to cool the engine cylinder or it may be used both to cool the engine cylinder and to heat air for the engine carbureter and in this connection it may be pointed out that it is a feature of the present invention to provide a motor vehicle in which the whole or a portion of the air for the carbureter is fed thereto by a conduit or conduits having heating means combined therewith, which motor vehicle is characterized in that said conduit or conduits constitute part of the vehicle framework. Conveniently a tubular portion of the framework of the vehicle to which the engine cylinder head is connected, is employed as the said air conduit and is open to atmosphere adjacent to the cylinder head.

The invention is particularly applicable to motor bicycles comprising a diamond-shaped framework with an internal-combustion engine situated at or toward the place in said framework which is normally occupied by the crank axle, said engine having a cylinder in alinement with and forming a continuation of that member of the framework which extends to the steering pillar and/or a cylinder in alinement, with and forming a continuation of that member of the framework which extends toward the seat pillar, and with a supplementary framework member extending between the steering and seat pillar framework members and connected to them above the engine cylinder or cylinders. According to a feature of the present invention, such a motor bicycle as this is characterized in that the said supplementary framework member carries or has built into it the engine carbureter. According to a further feature of the invention, intermediate the carbureter and the engine cylinder or cylinders, the supplementary framework member and the portions of the steering and or seat pillar framework members connecting it to the cylinder or cylinders form the aforesaid air conduit or conduits.

In one construction according to the present invention the cylinders are hinged to the framework members to which they are appropriated and the hollow ported connection between the cylinders and framework members may be ribbed if desired to furnish an extra air conduit surface and /or to strengthen the construction.

For a more complete understanding of these and other features of the present invention reference is directed to the accompanying drawings which show, by way of example only, certain constructional forms of motor bicycle according to the present invention. It is to be understood, however, that the invention is not limited to the precise constructional details enumerated.

In these drawings:—

Figure 1 is a side elevation of a motor bicycle according to the invention;

Fig. 2 is a vertical section through a portion of the motor bicycle shown in Fig. 1, Fig. 2 being on a larger scale than Fig. 1;

Fig. 3 is a view partly in section on somewhat similar lines to Fig. 2, but showing a modified construction. The scale of Fig. 3 is less than that of Fig. 2 but greater than that of Fig. 1, and Fig. 4 is a cross-section on the line 4—4 of Fig. 3;

Like reference numerals indicate like parts throughout the drawings.

Referring first of all to Figs. 1 and 2, in the construction shown therein a two cylinder engine is employed which is situated at or toward the place in the cycle framework which is normally occupied by the crank axle. The engine comprises a crank case 10 and cylinders 11 and 12 arranged in the form of a V. The cylinder 11 is in alinement with and forms a continuation of a member 13 of the framework which extends to the steering pillar 14 and the cylinder 12 is in alinement and forms a continuation of a member 15 which extends toward the seat pillar 16. The cylinders 11 and 12 are connected together by the crank case 10 and they form the connection between the lower ends of the members 13 and 15. Referring more particularly to Fig. 2 it will be seen that the cylinders each terminate in a cylinder head or extension 17 which is ported at 18 and is screwed at its end to receive a securing member 19 whereby it is attached to the lower end of the member 13, or 15. It will be appreciated that the ports 18 are arranged as close to the end of the cylinder as possible but they do not communicate with the interior of the latter. Connecting the steering pillar 14 with the upper end of the member 15 are two tubes 20 and 21 and extending between the members 13 and 15 is a supplementary tubular framework member 22 which is connected to the members 13 and 15 just above the cylinders 11 and 12. The framework 22 carries or has built into it the engine carburetor 23.

Instead of or in addition to a separate petrol tank, the interior of the tubes 13, 15, 20 and 21 may be employed to store the petrol or other motive fluid. A suitable filling aperture may be provided at 24 and closure plugs provided in the interior of the tubes at 25, 26, 27 and 28 to confine the petrol to the desired parts of the tubes. To convey the petrol to the carbureter a feed-pipe 29 running close to the tube 22 may be provided.

The carbureter employed may be of any suitable type, with or without a float feed. In the construction shown, see particularly Fig. 2, a dome shaped casing 30 is mounted in the tube 22. A conduit 31 in it communicates with the petrol feed-pipe 29 and the end of the conduit is controlled by the point 32 of a valve 33. The side walls of the dome 30 are ported at 34 and arranged about these walls is a ring 35 which is also ported. This ring 35 is controlled from the outside of the carbureter casing by a member 36, see Fig. 1. The ports 34 communicate with the interior of the tube 22 which receives air from the atmosphere through the ports 18 adjacent the cylinder ends. The direction of flow is indicated by the arrows in Fig. 2. This air in passing the cylinder heads is itself heated and acts to cool the cylinders. Heated air is thus supplied to the carbureter which tends to improve the efficiency thereof.

The valve 33 has a downwardly projecting boss 37 which is recessed to receive and slide upon the upper end of a controlling member 38. It is prevented from rotation relatively thereto by a pin and slot connection 39. The controlling member 38 is recessed to receive a spring 40 which presses at one end on the bottom of the recess in the member 38 and at the other end on the top of the recess in the valve 33. By this means the valve point 32 is kept pressed toward the end of the conduit 31. The valve point 32 is formed on the end of a stem 41 which projects downward through the controlling member and is formed outside thereof with a handle or knob 42 for finger adjustment. The stem 41 is screwed into the valve 33 and by this means the point 32 can be adjusted longitudinally in the valve 33 without dismounting the carbureter. The controlling member 38 is formed with an outer shell 43 which is ported at 44 and which is received in a casing 45 mounted upon the framework member 22. The casing 45 has connected to it delivery pipes 46 leading to the engine cylinders and the ends of these pipes in the casing 45 are controlled by the shell 43. The controlling member 38 is provided with an external arm 47 whereby it may be operated by the rider of the cycle. By rotating the controlling member 38 the ports 44 can be brought into any desired relation with the apertures leading to the feed pipes 46 and thus the supply to the latter controlled. The valve 33 is provided with a seat 48 in the base of the dome 30, and the spring 40 tends to maintain the valve on this seat.

The valve 33 will normally tend to prevent the delivery of petrol from the conduit 31 and any delivery past the valve seat 48. On the suction stroke of the engine, however, the valve 33 will be pulled away from its seat against the pressure of the spring 40, and will permit petrol to flow past the valve point 32 and mingle with the heated air coming through the ports 34. The petrol and air pass along the conical face of the valve 33, which assists to mix them, and then pass to the interior of the casing 45, whence they are delivered to the pipes 46.

As has already been intimated any type of carbureter may be employed. The construction above described in detail is one which in some circumstances may be suitable as it has the advantage of not containing a float. It is to be understood, however, that this construction of carbureter is not claimed as being broadly novel.

The carbureter casing includes tubular extensions 49 which receive the ends of the parts of the framework member 22 and are securely attached thereto. In this way the efficiency of the framework member 22 as a tie or strut is not impaired.

Referring now to Figs. 3 and 4, a modified construction is illustrated therein in which the ported extension from the head of the cylinder is only employed to cool the cylinder and is not used to heat the air for the carbureter. In this construction the carbureter 23 is of substantially the same construction as already described, but its casing is provided with one or more air inlet apertures 50 communicating direct with the atmosphere instead of through the interior of the member 22.

The cylinder heads are each formed with upstanding lugs 51 which are spaced apart to provide a port or throughway 52 for the passage of air currents. The lugs 51 carry bosses 53 between which is pivoted the end 54 of a cap 55 on the lower end of the framework member 13 15. This pivotal connection is found to facilitate in some constructions the mounting of the engine on the framework.

Preferably the lugs 51 are ribbed as at 56 to provide extra cooling area and incidentally to strengthen the construction.

From the foregoing description it will be clear that the invention provides a construction of motor cycle which can be very lightly and compactly manufactured without the sacrifice of strength. The actual details of construction, however, may be modified in many respects without departing from the spirit and scope of the invention.

What I claim as my invention and desire to secure by Letters Patent is:—

1. In a motor vehicle, the combination of a vehicle framework member, an engine cylinder having an imperforate head secured to the framework member in such a manner as to form a continuation of said framework member with the axis of the cylinder in alinement with the framework member, said framework member being tubular adjacent the head of the cylinder and being ported also adjacent the head of the cylinder to admit air current during travel of the vehicle.

2. In a motor vehicle, a vehicle framework comprising a hollow member which is open to admit air to its interior, in combination with a carbureter, means for connecting said carbureter to said hollow member to receive air therefrom, and heating means combined with said hollow member.

3. In a motor vehicle, the combination of a vehicle framework member, an engine cylinder, means for mounting the cylinder on the framework member, said member being tubular adjacent the head of the cylinder and being ported also adjacent the head of the cylinder to admit air to its interior, a carbureter, and means for connecting said carbureter to the interior of said tubular famework member to receive air therefrom.

4. A motor bicycle comprising a diamond-shaped framework, including steering pillar and seat pillar framework members, an internal-combustion engine cylinder situated adjacent the place in said framework which is normally occupied by the crank axle, said cylinder being in alinement with and forming a continuation of a hollow ported member of the framework which extends to the steering pillar, and said framework including a hollow supplementary member extending between the steering and seat pillar framework members and connected to them above the engine cylinder, the hollow interiors of said members being in communication, and a carbureter mounted on the supplementary framework member to receive air from the interior therof.

5. A motor bicycle comprising a diamond-shaped framework, including steering pillar and seat pillar framework members, an internal-combustion engine cylinder situated adjacent the place in said framework which is normally occupied by the crank axle, said cylinder being in alinement with and forming a continuation of a hollow ported member of the framework which extends toward the seat pillar, and said framework including a hollow supplementary member extending between the steering and seat pillar framework members and connected to them above the engine cylinder, the hollow interiors of said members being in communication, and a carbureter mounted on the supplementary framework member to receive air from the interior thereof.

6. A motor bicycle comprising a diamond-shaped framework, including steering pillar and seat pillar framework members, internal-combustion engine cylinders situated at the place in said framework which is normally occupied by the crank axle, said cylinders being one in alinement with and forming a continuation of that member of the framework which extends to the steering pillar and the other in alinement with and forming a continuation of that member of the framework which extends toward the seat pillar, and said framework including a supplementary member extending between the steering and seat pillar framework members and connected to them above the engine cylinders, a carbureter and means for mounting said carbureter on the supplementary framework member.

7. A motor bicycle comprising a diamond-shaped framework, including steering pillar and seat pillar framework members, an internal-combustion engine cylinder situated at the place in said framework which is normally occupied by the crank axle, and mounted on said framework members, said framework also including a supplementary member extending between the steering and seat pillar framework members and connected to them above the engine cylinder, which supplementary member and the portions of the other framework members connecting it to the engine cylinder is tubular and is ported adjacent the head of the cylinder to admit air currents during travel of the vehicle, a carbureter, means for mounting said carbureter on the supplementary framework member and means for connecting said carbureter to the interior of the supplementary framework member to receive air therefrom.

8. A motor bicycle comprising a diamond-shaped framework, including steering pillar and seat pillar framework members, internal-combustion engine cylinders situated at the place in said framework which is normally occupied by the crank axle, said cylinders being one in alinement with and forming a continuation of that member of the framework which extends to the steering pillar and the other in alinement with and forming a continuation of that member of the framework which extends toward the seat pillar, and said framework including a supplementary member extending between the steering and seat pillar framework members and connected to them above the engine cylinders, a carbureter and means for mounting said carbureter on the supplementary framework member, and said cylinders being connected together and forming the connection between the aforesaid members of the framework in such a manner as to take up a portion of the stresses set up therein during travel of the vehicle.

9. In a motor vehicle, in combination, two downwardly converging vehicle frame members, and a motor having two cylinders secured together at an angle, said cylinders forming continuations respectively of said frame members to support the frame.

10. A motor bicycle comprising a framework including steering pillar and seat pillar framework members, inclined members extending toward said pillar members from the place in said framework normally occupied by the crank axle, and a transverse member connecting said inclined members, one of the inclined members being hollow and provided with air inlet ports and the transverse member being also hollow and having its interior in communication with the interior of the hollow inclined member, an engine cylinder below said transverse member, and a carbureter supported on said member and arranged to receive its supply of air from the interior thereof.

11. A motor bicycle comprising a framework including steering pillar and seat pillar framework members, inclined members extending toward said pillar members from the place in said framework normally occupied by the crank axle, and a transverse member connecting said inclined members, one of the inclined members being hollow and provided with air inlet ports and the transverse member being also hollow and having its interior in communication with the interior of the hollow inclined member, an engine cylinder below said transverse member, and a carbureter built into the transverse member and arranged to receive its supply of air therethrough.

In testimony whereof I affix my signature.

JOSEPH GLADSTONE OWEN.